(12) United States Patent
Pareschi et al.

(10) Patent No.: US 12,138,656 B2
(45) Date of Patent: Nov. 12, 2024

(54) METHOD FOR APPLYING A CARBON-BASED REFLECTIVE OVERCOATING ON A GRAZING INCIDENCE OPTICAL UNIT

(71) Applicants: ISTITUTO NAZIONALE DI ASTROFISICA, Rome (IT); POLITECNICO DI MILANO, Milan (IT); MEDIA LARIO S.R.L., Bosisio Parini (IT)

(72) Inventors: Giovanni Pareschi, Merate (IT); Marta Maria Civitani, Merate (IT); Giorgia Sironi, Merate (IT); Giuseppe Valsecchi, Bosisio Parini (IT); Luca Magagnin, Milan (IT); Eugenio Gibertini, Milan (IT)

(73) Assignees: ISTITUTO NAZIONALE DI ASTROFISICA (IT); POLITECNICO DI MILANO (IT); MEDIA LARIO S.R.L. (IT)

(*) Notice: Subject to any disclaimer, the term of this patent is extended or adjusted under 35 U.S.C. 154(b) by 0 days.

(21) Appl. No.: 17/634,472

(22) PCT Filed: Aug. 13, 2020

(86) PCT No.: PCT/IB2020/057628
§ 371 (c)(1),
(2) Date: Feb. 10, 2022

(87) PCT Pub. No.: WO2021/028865
PCT Pub. Date: Feb. 18, 2021

(65) Prior Publication Data
US 2022/0331836 A1    Oct. 20, 2022

(30) Foreign Application Priority Data
Aug. 13, 2019 (EP) .................................. 19191474

(51) Int. Cl.
*B05D 5/06* (2006.01)
*B05D 3/06* (2006.01)
(Continued)

(52) U.S. Cl.
CPC ............... *B05D 5/063* (2013.01); *B05D 3/06* (2013.01); *B05D 7/24* (2013.01); *G21K 1/067* (2013.01)

(58) Field of Classification Search
CPC ........ C23C 16/26; C23C 16/27; G21K 1/062; G21K 1/067; B05D 1/02; B05D 1/18; B05D 1/30; B05D 1/305; B05D 1/28; B05D 1/26
See application file for complete search history.

(56) References Cited

U.S. PATENT DOCUMENTS 5,042,059 A    8/1991    Watanabe et al.
5,273,788 A *   12/1993    Yu ........................ B05D 1/208
                                              423/446
(Continued)

OTHER PUBLICATIONS

Rieutord F; Benattaret et al: "X-ray optics in Langmuir-Blodgett films", J. Physique,, vol. 48, Apr. 1, 1987 (Apr. 1, 1987) , pp. 679-687, XP001416950, p. 680.
(Continued)

*Primary Examiner* — Michael P Wieczorek
(74) *Attorney, Agent, or Firm* — The Belles Group, P.C.

(57) ABSTRACT

A method for applying a carbon-based reflective overcoating on a grazing incidence optical unit comprising a substrate and a coating of a high-density material chosen from the group comprising gold, platinum, iridium, palladium, rhodium, ruthenium, chrome and nickel or a low-density material such as carbon or B4C; the method comprises the step of treating the optical unit with a solution or gaseous phase containing at least one polymer precursor material to create
(Continued)

the overcoating through absorption of the polymer material on the coating.

15 Claims, 3 Drawing Sheets

(51) Int. Cl.
*B05D 7/24* (2006.01)
*G21K 1/06* (2006.01)

(56) References Cited

U.S. PATENT DOCUMENTS

| | | | |
|---|---|---|---|
| 5,461,657 A * | 10/1995 | Hayashida | G21K 1/06 378/84 |
| 6,226,349 B1 * | 5/2001 | Schuster | G21K 1/062 378/81 |
| 9,406,509 B2 * | 8/2016 | Manna | H01L 21/0271 |
| 2005/0129927 A1 * | 6/2005 | Minami | B01J 31/0274 428/323 |
| 2009/0220696 A1 | 9/2009 | Chung et al. | |
| 2015/0153485 A1 * | 6/2015 | Monty | G02B 1/14 204/192.27 |

OTHER PUBLICATIONS

Dick Willingale et al: "Athena Mirror Optimization and Calibration Exploring the Hot and Energetic Universe Palermo Sep. 24-27, 2018 ", Sep. 24, 2018 (Sep. 24, 2018), XP055666268, Retrieved from the Internet: https://www.isdc.unige.ch/athena/Repository/Open_access/Second_Athena_Conference/Willingale.pdf, retrieved on Feb. 7, 2020.

\* cited by examiner

METHOD FOR APPLYING A CARBON-BASED REFLECTIVE OVERCOATING ON A GRAZING INCIDENCE OPTICAL UNIT

CROSS-REFERENCE TO RELATED APPLICATIONS

This patent application is a U.S. national stage application under 35 U.S.C. § 371 of PCT application no. PCT/IB2020/057628, filed on Aug. 13, 2020, which claims priority from European patent application no. 19191474.6 filed on Aug. 13, 2019. The entire disclosure of the aforementioned priority applications are incorporated herein by reference in their entireties.

TECHNICAL FIELD

The present invention relates to a method for applying a carbon-based reflective overcoating on a grazing incidence optical unit.

BACKGROUND ART

The invention finds its preferred, although not exclusive, application in the production of mirrors for X-ray telescopes, to which particular reference will be made hereinafter, but without any loss of generality.

The expression "optical unit" is used here to comprise both mirrors of monolithic structure and modules of segmented structure or pores.

Given the opacity of the Earth's atmosphere to the wavelengths of the X-rays considered, X-ray telescopes can only work in space. However, the use of reflective optics for X-rays also finds use in other sectors such as, for example, medical physics, radiographic imaging and the study of materials through irradiation with X-ray beams produced by particle accelerators, such as synchrotrons.

In the grazing incidence mirrors for X-rays in space applications, operating in the so-called "classic" X-ray region (soft X-rays, with energy levels below 10 keV), high-density reflective coatings (for example, gold, platinum or iridium) are normally used. This enables extending the energy band in which there is efficient reflection for the same angle of reflection, or extending the critical angle for total reflection for the same energy. In fact, the critical angle θ, for total reflection is proportional to the inverse of the energy E of the incident X-rays and directly proportional to the square root of the density p of the reflecting material:

$$\theta_c \propto \frac{\sqrt{\rho}}{E}$$

However, materials of high density (and consequently also of higher atomic number Z) cause greater attenuation of the reflected beam due to photoelectric absorption, especially near the absorption edges (in particular in the spectral region between 0.5 and 4 keV).

A situation thus occurs whereby low-density films (for example, C, B4C and B) have higher reflectivity (close to 100%) in the total reflection regime, but a limitation with regard to the energy band, while those of higher density (Au, Ire, Pt, W, Cr, Ni) have wider bands, but lower reflectivity.

The effect of a reduction in reflectivity for heavy elements due to photoelectric absorption is particularly penalising in astronomical optics because double reflection systems are normally used.

To overcome this problem, it has been proposed to use a layer of low-density material, based on carbon or similar materials, as an overcoating for the layer of high-density metal. This solution is known, for example, from the following publications:

V. Cotroneo, D. Spiga, M. Barbera, R. Bruni, K. Chen, et al., Carbon overcoatings for soft x-ray reflectivity enhancement, Proc. SPIE 6688, Optics for EUV, X-Ray, and Gamma-Ray Astronomy III, 66880U (20 Sep. 2007); and V. Cotroneo, D. Spiga, R. Bruni, W. Burkert, M. Freyberg, et al., New developments in light material overcoating for soft x-ray reflectivity enhancement, Proc. SPIE 7011, Space Telescopes and Instrumentation 2008: Ultraviolet to Gamma Ray, 701119 (15 Jul. 2008).

In this way, it is possible to obtain greater reflectivity at low energy, whilst maintaining a wide passband. Concerning this, refer to FIG. 1, which indicates the reflectivity calculated for a single layer of platinum, a single layer of carbon, and a layer of platinum with an overcoating of carbon 10 nm thick.

The solution of overcoatings based on carbon or B4C has been proposed for several space missions, such as Athena (ESA), Lynx (NASA) and eXTP (CAS).

The application of the overcoating in a low-density material based on Carbon (or Boron, or their derivatives) takes place by deposition in a high vacuum through evaporation by e-beam or Joule effect (physical vapour deposition) or by sputtering.

The aforementioned high-vacuum application processes are very expensive and are not applicable to all types of mirrors.

A first case in which the known processes have application limits is that of mirrors formed by monolithic shells, for example, nickel with a gold coating, produced by replication, which is one of the standard methods for the production of astronomical mirrors with diameters of 5 to 70 cm. The mirrors for the Beppo-SAX, XMM-Newton, Swift, eRosita, Einstein Probe missions were made using this method. The method provides for the following steps:

making a super-polished aluminium mandrel with a nickel/phosphor alloy coating, which constitutes the negative form of the mirror;

depositing a gold coating approximately 100 nm thick on the mandrel;

electroforming the walls of nickel on the gold-coated mandrel.

separating the nickel shell with the gold coating from the mandrel, (the gold layer not only acts as a reflective layer, but also as the separating agent, due to the low adhesion with the mandrel).

The use of known techniques for applying the carbon-based overcoating on the known gold layer in combination with this production process is very problematic, both in the hypothesis of placing the carbon layer on the mandrel before the gold layer, and in the hypothesis of a placing the carbon layer on the gold layer after separation of the shell from the mandrel.

In fact, the carbon-based layer cannot be deposited on the mandrel before the gold because it would contaminate the evaporation chamber and, in any case, would adhere to mandrel, preventing replication.

Deposition of the carbon-based layer on the gold layer after separation of the shell from the mandrel would require the use of a linear deposition source, via sputtering for example, from inside the shell; the method is only feasible for relatively large shells (diameters greater than 20 cm) and, in any case, is very expensive.

Monolithic mirrors can also be produced with other methods and materials, both by replica technologies and by moderation and direct super-cleaning of the surface of the shells, but they would equally have similar problems in applying overcoatings in carbon-based materials on the high-density reflective layer (gold, carbon, iridium or tungsten).

Another known method for making mirrors of both large and small sizes is by the assembly of mirror modules, each of which is constituted by a stack of wafers of silicon or other materials, such as thin sheets of glass, provided with parallel ribs so as to create a series of "pores". The so-called Silicon Pore Optics (SPO) produced by cold replication for the ATHENA (ESA) mission are also included in this category of optics for X-rays.

If the mirror is of the Wolter-I type, i.e. composed of a parabolic section and a hyperbolic section in series, the modules are constituted by two wafer stacks, respectively parabolic (SPO-P) and hyperbolic (SPO-H), solidarized to each other with precision.

Application of the low-density layer is also problematic in this case.

The high-density reflective coating of the wafers, generally of iridium, is applied on the individual wafers, via sputtering, before their assembly. Application of the carbon layer is incompatible with the assembly method because the carbon would pollute the process chambers; alternative materials to carbon have been tested, such as boron, boron carbide (B4C) or silicon carbide, with unsatisfactory results for reasons of structural resistance (tendency of overcoating delamination), difficulty in application and/or unsatisfactory optical properties.

DISCLOSURE OF INVENTION

The object of the present invention is to provide a method for applying a reflective carbon-based overcoating on grazing incidence optical elements, which solves the problems associated with the known processes described above.

The aforementioned object is achieved by a method for applying a reflective carbon-based overcoating on a grazing incidence optical unit, the optical unit comprising a substrate and a high-density coating chosen from the group comprising gold, platinum and iridium, tungsten, chrome and nickel, comprising the step of immerging the optical unit in a solution or gaseous phase containing at least an organic precursor material to cause a deposition of the precursor material on the coating of high-density material.

In this way, it is possible to deposit even very thin layers of carbon-based material, typically with a thickness of approximately 1-2 nm. By repeating the method, it is possible to obtain layers of the desired thickness, for example 6-10 nm.

If necessary, the method can comprise a step of exposing the overcoating layer to a source of ultraviolet (UV) rays or other radiation (laser or X-rays) or to high temperatures to eliminate oxygen and, if necessary, also hydrogen from the polymer chains.

BRIEF DESCRIPTION OF THE DRAWINGS

For a better understanding of the present invention, two preferred embodiments are described hereinafter, purely by way of non-limitative example and with reference to the accompanying drawings, in which.

BEST MODE FOR CARRYING OUT THE INVENTION

Figure 1:
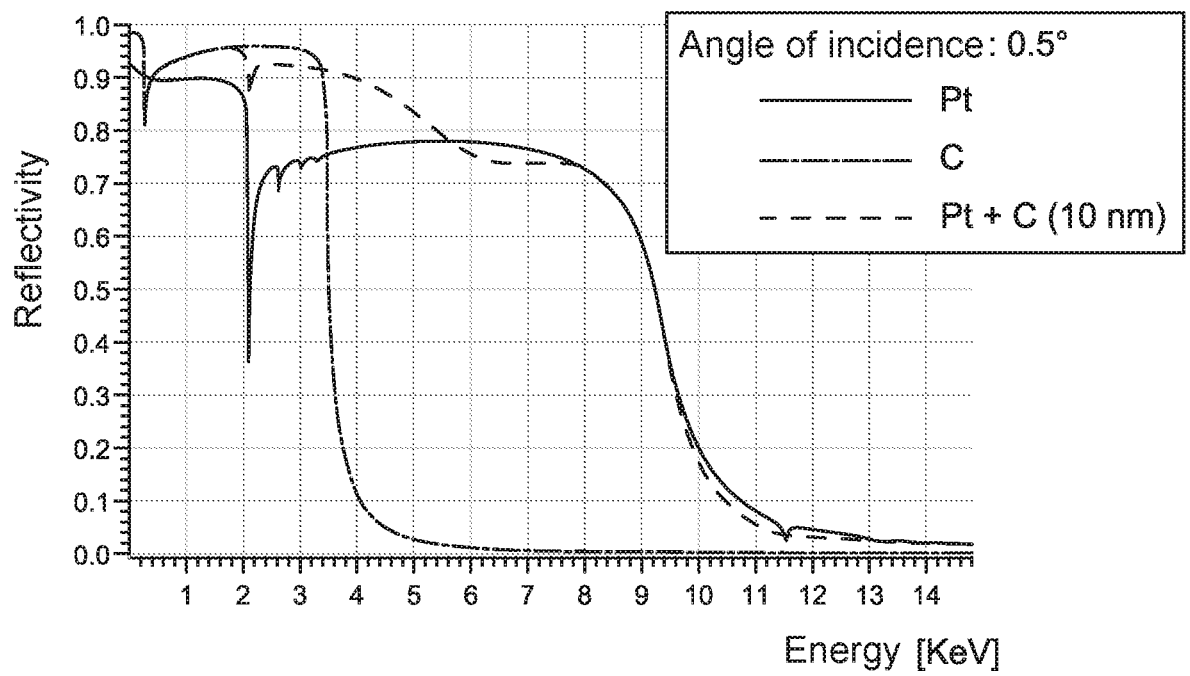
FIG. 1 shows the reflectivity of different coating materials compared, as a function of the energy of the incident ray.
Figure 2:
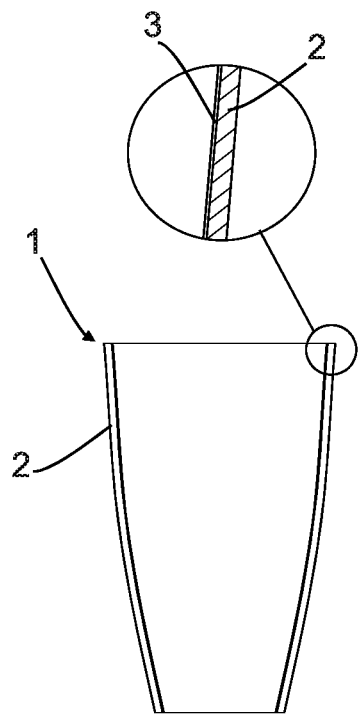
FIGS. 2 to 6 schematically show successive steps of the method of the invention for producing a monolithic shell mirror.

Referring to FIG. 2, reference numeral 1 indicates, as a whole, a monolithic shell optical unit for an astronomical X-ray mirror.

The unit 1 comprises a monolithic shell 2, for example of nickel, and an inner coating 3 of gold. The unit 1 can be made in a known manner by a replica process on a mandrel, as described in the introductory part of the description.

Figure 3:
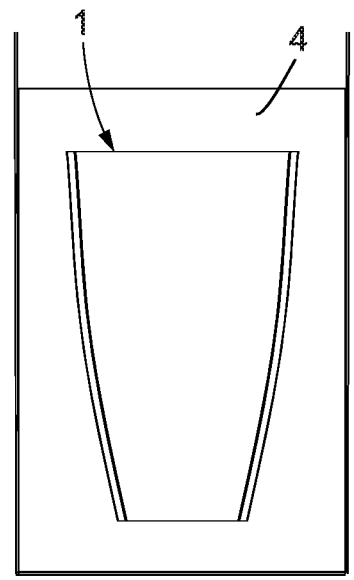

According to one embodiment of the present invention (FIG. 3), the unit 1 is immersed in a solution 4 or exposed to a gaseous phase containing an organic precursor material comprising one or more organic compounds containing sulphur, preferably chosen from the group comprising alkyl thiols [HS(CH2)$_n$X], alkyl disulphides [X(CH2)$_m$S—S(CH2)$_n$X] and alkyl sulphides [X(CH2)$_m$S(CH2)$_n$X], where X represents a terminal group constituted, for example, by —CH3, —OH, or —COOH.

According to another embodiment of the present invention, the precursor material comprises one or more organosilane compounds, chosen from the group comprising chlorosilanes [X(CH2)$_n$SiCl4] and alkoxysilanes [X(CH2)$_n$Si(OR')], where X represents a terminal group constituted, for example, by —CH3, —OH, —COOH, —NH2, —HC=CH2, —CH$_2$=CHCOO$^-$, —CH2OCH2, —SH, —CH=O, or a combination thereof.

Alternatively, different precursor materials can be used in succession, such as one or more organic compounds containing sulphur in combination with one or more organosilane compounds, as shown above.

The precursor is dissolved in non-aqueous solvents such as alcohol or anhydrous saturated and unsaturated hydrocarbons comprising, but not limited to, hexane, heptane, hexadecane, toluene, chlorobenzene, ethers, carbon disulphide and chloroform.

It is possible to make thicker layers of overcoating 5, conveniently in the order of 6-10 nm thick, by means of successive immersions.

According to one example of overcoating treatment, a wafer pre-coated with a thin gold layer of X nm is immersed in 200 ml of a 1 mM solution of mercaptoundecanoic acid in absolute ethanol for 24 hours. Afterwards, the wafer is removed and abundantly rinsed with ethanol. The overcoating thickness obtained is approximately 10 Å. By repeating the process, it is possible to increase the thickness of the overcoating.

Optionally, the wafer treated with a molecular monolayer is immersed in 200 ml of another 2% v/v solution of aminopropyltrimethoxysilane (APTMS) in toluene for 2-4 hours, to form a further monolayer of overcoating chemically bonded to the first by an O—H—N bond. The process can be repeated to increase the thickness of the overcoating.

Optionally, the wafer treated with a double molecular layer is immersed in 200 ml of a 1 mM solution of octadecyltrichlorosilane (OTS) in hexane for 24 hours. The wafer is abundantly rinsed in hexane and heated in air at 120° C. for 30 minutes. The third molecular layer adds approximately 2.5 nm to the thickness of the overcoating.

Figure 4:
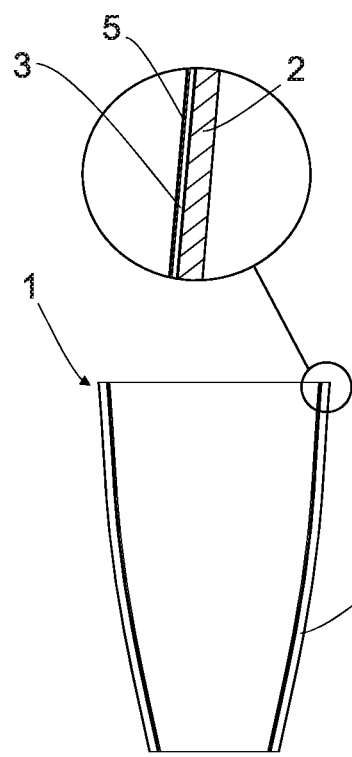

The aforementioned precursor materials tend to form, through absorption, a molecular monolayer di overcoating 5 of nanometre thickness on the gold layer (FIG. 4).

Figure 5:
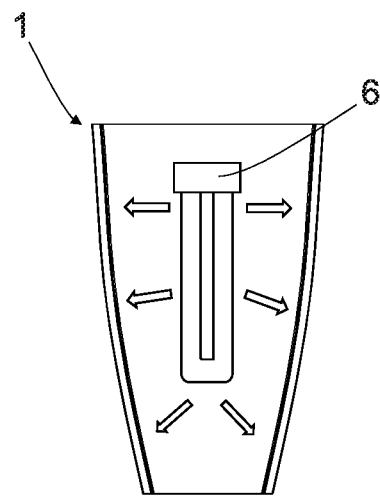
Figure 6:
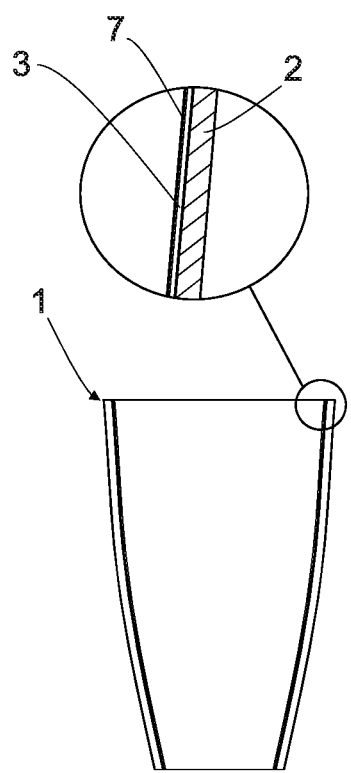
Figure 7:
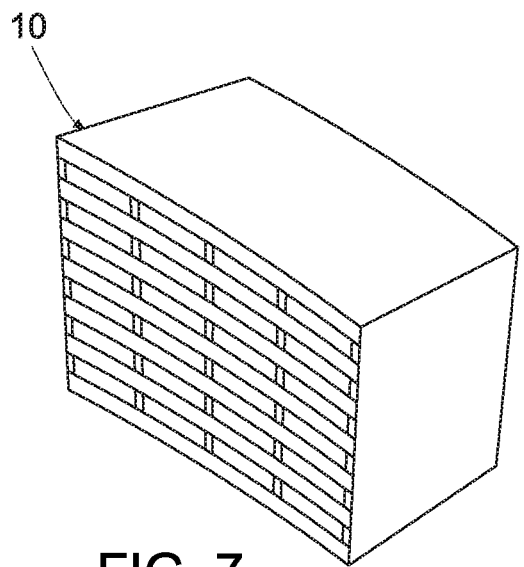
FIGS. 7 to 9 schematically show successive steps of the method of the invention for producing segmented optical modules (SPO).

Optionally, if the molecule of the precursor material contains oxygen, the layer of overcoating 5 can be exposed to UV rays (for example, by a UV lamp 6 arranged inside the shell 2, see FIG. 5), or other suitable radiation (laser or X-rays) so as to obtain an oxygen-free alkyl layer 7 (FIG. 6).

A similar method, mutatis mutandis, can be used to produce segmented optics, if necessary, assembled in stacks so as to form so-called "pore" optics (Silicon Pore Optics—SPO, if based on silicon substrates).

Figure 8:
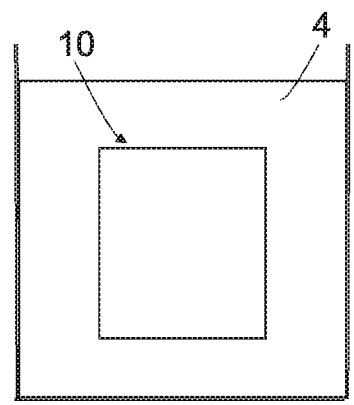

In this case, instead if immerging the monolithic shell in the solution, the individual segments or modules formed by segment stacks 10 (FIG. 8) constituting the optics are immerged.

According to one example of treatment, a wafer pre-coated with a thin layer of iridium of X nm is activated by exposure to ozone plasma for 30 seconds. Then, the wafer is immersed in 200 ml of a 1 mM solution of octadecyltrichlorosilane (OTS) in hexane for 24 hours. The wafer is abundantly rinsed with hexane and heated in air at 120° C. for 30 minutes. The monolayer thus obtained has a thickness of approximately 2.5 nm.

According to a further example of treatment, a wafer pre-coated with a thin layer of iridium of X nm is activated by exposure to ozone plasma for 30 seconds. Then, the wafer is immersed in 200 ml of a 1 mM solution of octadecyltrichlorosilane (OTS) in hexane for 7 days. The wafer is abundantly rinsed with hexane and heated in air at 120° C. for 30 minutes. The monolayer thus obtained has a thickness of approximately 9 nm.

Figure 9:
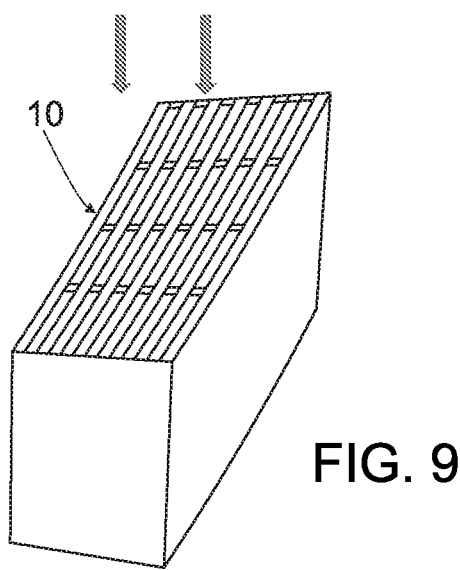

If the material contains oxygen, the module can be exposed to a source of UV rays, laser or X-rays for elimination of the oxygen (FIG. 9).

At the end of the process (FIG. 11), an oxygen-free alkyl layer of overcoating on the iridium is thus obtained.

From an examination of the characteristics of the described process, the advantages that can be achieved therewith are evident.

Due to the technique of coating by immersion, all of the problems related to known vacuum deposition processes (e-beam, physical vapour deposition and sputtering) are eliminated.

Low-density overcoatings with optimal optical and physical characteristics are thus obtained at substantially reduced cost with respect to the known techniques.

Moreover, the process of the invention is extremely simple and does not suffer from the described application limits, being utilizable for any type of monolithic or segmented mirror. If necessary, the method could be employed to even cover a carbon or B4C film already deposited with a high-vacuum process (for example, sputtering or evaporation by Joule effect) with a carbon-based film, to protect the underlying films and make them more stable.

The invention claimed is:

1. A method for applying a carbon-based reflective overcoating on a grazing incidence optical unit, the optical unit comprising a substrate and a coating of a first material, the method comprising: treating the optical unit with a liquid solution containing at least one organic precursor material to cause an absorption of the precursor material on said coating, and forming said carbon-based reflective overcoating from the precursor material, wherein the optical unit comprises a monolithic shell of nickel and the first material is a high-density material chosen from the group consisting of gold, platinum, iridium, palladium, rhodium, ruthenium, chrome and nickel.

2. The method according to claim 1, wherein said at least one precursor material comprises an alkyl chain and at least one of the functional groups —$CH_3$, —OH, —COOH, —$NH_2$, —HC=$CH_2$, —$CH_2$=CHCOO$^-$, —$CH_2OCH_2$, —SH and —CH=O.

3. The method according to claim 2, wherein the precursor material is a material chosen from the group consisting of alkyl mercaptans, alkyl disulphides and alkyl sulphides.

4. The method according to claim 1, wherein the precursor material contains oxygen.

5. The method according to claim 4, further comprising, after the step of treatment with the liquid solution, the step of exposing the optical unit to a source of radiation adapted to eliminate the oxygen from the precursor material.

6. The method according to claim 1, wherein the precursor material contains silicon.

7. The method according to claim 6, wherein said at least one precursor material is an organosilane.

8. The method according to claim 1, wherein the material of the overcoating comprises an organic compound containing sulphur.

9. The method according to claim 1, wherein the optical unit is a module of an SPO optics constituted by at least one silicon wafer stack, and the first material is constituted by iridium.

10. The method according to claim 9, wherein the material of the overcoating comprises an organic compound containing silicon.

11. A method for applying a carbon-based reflective overcoating on a grazing incidence optical unit, the optical unit comprising a substrate and a coating of a first material, the method comprising: treating the optical unit with a liquid solution containing at least one organic precursor material to cause an absorption of the precursor material on said coating, and forming said carbon-based reflective overcoating from the precursor material, wherein said first material is chosen from the group consisting of carbon and $B_4C$.

12. A method for applying a carbon-based reflective overcoating on a grazing incidence optical unit, the optical unit comprising a substrate and a coating of a first material, the method comprising the step of treating the optical unit with a solution containing at least one organic precursor material to cause an absorption of the precursor material on said coating, wherein the optical unit comprises a monolithic shell of nickel and the first material is gold.

13. The method according to claim 12, wherein the material of the overcoating is an organic compound containing sulphur.

14. A method for applying a carbon-based reflective overcoating on a grazing incidence optical unit, the optical unit comprising a substrate and a coating of a first material, the method comprising the step of treating the optical unit with a solution containing at least one organic precursor material to cause an absorption of the precursor material on said coating wherein the optical unit is a module of an SPO optics constituted by at least one silicon wafer stack, and the first material is constituted by iridium.

15. The method according to claim 14, wherein the material of the overcoating is an organic compound containing silicon.

* * * * *